(12) United States Patent
Pozivilko et al.

(10) Patent No.: US 7,735,612 B2
(45) Date of Patent: Jun. 15, 2010

(54) BALL RAMP BRAKE

(75) Inventors: Peter J. Pozivilko, Saint Joseph, MI (US); Brian P. Dennis, Kalamazoo, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 0 days.

(21) Appl. No.: 11/314,449

(22) Filed: Dec. 22, 2005

(65) Prior Publication Data

US 2007/0144838 A1 Jun. 28, 2007

(51) Int. Cl.
*F16D 55/36* (2006.01)

(52) U.S. Cl. .................. 188/71.5; 188/72.7; 188/72.6

(58) Field of Classification Search ........... 188/71.5, 188/71.6, 72.7, 71.4, 72.6, 72.8, 73.34, 344
See application file for complete search history.

(56) References Cited

U.S. PATENT DOCUMENTS

| | | | | |
|---|---|---|---|---|
| 4,027,758 | A * | 6/1977 | Gustavsson et al. | 192/113.36 |
| 4,372,433 | A * | 2/1983 | Mitchell et al. | 192/18 R |
| 6,374,958 | B1 | 4/2002 | Usui et al. | 188/72.7 |
| 6,481,541 | B2 * | 11/2002 | Taki et al. | 188/71.5 |
| 2001/0023798 | A1 * | 9/2001 | Usui et al. | 188/72.1 |
| 2003/0164271 | A1 | 9/2003 | Boisseau | 188/72.7 |
| 2004/0035655 | A1 | 2/2004 | Usui | 188/161 |
| 2004/0262097 | A1 | 12/2004 | Gerard et al. | 188/72.8 |
| 2005/0217949 | A1 | 10/2005 | Ohta | 188/72.8 |

FOREIGN PATENT DOCUMENTS

| | | |
|---|---|---|
| EP | 1 039 165 | 9/2000 |
| WO | WO 02/44582 | 6/2002 |

OTHER PUBLICATIONS

Prior art drawing, Ausco Products, Inc., Benton Harbor, Michigan dated Apr. 8, 2002.
European Search Report for the corresponding European Application (Jul. 30, 2008).

* cited by examiner

*Primary Examiner*—Xuan Lan Nguyen
(74) *Attorney, Agent, or Firm*—Renner, Kenner, Greive, Bobak, Taylor & Weber

(57) ABSTRACT

A brake (10) for applying a braking force to a shaft includes a housing (11) which defines a chamber (17). The housing (11) includes a plurality of depressions (19) circumferentially spaced around an axis (22). A rotatable actuator (40) is received in the chamber (17) and includes a plurality of depressions (43) circumferentially spaced around the axis (22). The housing depressions (19) face the rotatable actuator depressions (43) and each matching pair of depressions receive a ball (23) therebetween. A spring (50) under compression is positioned centrally about the axis (22). A bearing (56) is interposed between the rotatable actuator (40) and disc assembly (70) which minimizes frictional effects and rotational feedback during brake actuation. When the rotatable actuator (40) is rotated, the balls (23) roll along the depressions (19, 43) to gradually shallower portions thereof. This moves the rotatable actuator (40) axially away from the housing (11), thereby applying a braking force to the shaft. The spring (50) compressively opposes the axial movement of the rotatable actuator (40) away from the housing (11).

13 Claims, 5 Drawing Sheets

BALL RAMP BRAKE

TECHNICAL FIELD

This invention relates to a ball ramp brake with rotatable actuator. More specifically, this invention relates to such a brake wherein the rotatable actuator is biased toward a non-actuated state by a center mounted spring.

BACKGROUND ART

Ball ramp caliper brakes are a useful and convenient means of providing a braking force. Generally such brakes include a rotatable actuator and a stationary actuator, each of which have depressions which are circumferentially spaced around an axis. Steel balls are held within these depressions, and when the rotatable actuator is caused to rotate, the balls roll gradually along the depressions. This in turn causes the rotatable actuator to move axially away from the stationary actuator thereby applying a braking force to a disc assembly. These brakes are relatively simple in design because they do not require complex hydraulic mechanisms. Thus, the brakes are relatively dependable and easy to service and operate. Still some deficiencies exist in prior art ball ramp brakes.

One such deficiency is the undue complexity and inadequacies in the return mechanism. Such return mechanisms are provided to return the brake to an unactuated state after the rotatable actuator is rotated. Prior art return mechanisms typically include a plurality of springs which are coupled to the rotatable actuator and pre-tensioned to pull the rotatable actuator toward the stationary actuator. These springs are circumferentially spaced around the axis of rotation and resist the outward axial movement of the rotatable actuator. This orientation is unduly complex primarily due to difficulties in the construction and pre-tensioning of the springs. Further, because a plurality of outwardly spaced springs are used, the return force may be uneven resulting in undue wear and reduced performance. Still further, such designs typically require an additional spring positioned on the actuating cable which rotates the rotatable actuator. Thus, multiple springs are required to provide adequate return forces. This added complexity can cause increased cost, difficulty in construction and added maintenance concerns.

Yet another deficiency in prior art ball ramp brakes is found at the interface of the rotatable actuator and disc assembly. Typically, the disc assembly includes a plurality of rotatable discs which are slidably coupled to a rotatable shaft and a plurality of stationary discs located at the ends of the disc assembly and interposed between the rotatable discs. The stationary discs fit over, but do not engage, the rotating shaft, and are slidably coupled to the housing via a plurality of pins. Thus, the rotatable discs rotate with the shaft and the stationary discs are prevented from rotating relative to the housing. The entire disc assembly is free to slide axially so that when an axial force is applied to the disc assembly via the rotatable actuator, the discs are clamped together and the rotatable discs urge the stationary discs to rotate. Because the stationary discs are coupled to the housing, they are prevented from relative rotation, and a braking torque is applied to the rotating shaft. Yet because of the relative tolerances and the nature of the engagement between the stationary discs and the pins, a certain amount of clearance is necessary between the pin and stationary discs, and this clearance allows for a small degree of rotation. Thus, when the rotatable and stationary discs are caused to engage each other, the stationary discs will rotate slightly, until they fully engage the pin, which restricts any further rotation. Additionally, because the stationary discs are typically metallic, some degree of "flex" occurs when a rotational torque is applied by the rotatable discs. The result of these combined effects is that the stationary disc which engages the rotatable actuator will apply a slight feedback rotation to the rotatable actuator as the disc assembly is axially compressed. This feedback rotation can greatly affect the resulting braking torque depending upon the direction of shaft rotation. For example, if the shaft rotates in the same direction as the rotatable actuator, the feedback rotation will supplement the rotation of the rotatable actuator, resulting in a greater net braking torque. If the shaft rotates in the opposite direction as the rotatable actuator, the feedback rotation will oppose the rotation of the rotatable actuator, resulting in a reduced net braking torque. This variation in braking force, referred to as a directional bias, is undesirable in many applications.

Further, prior art brakes of this design are inefficient because, as the rotatable actuator is rotated, friction is created between the rotatable actuator and the stationary disc proximate thereto. Thus, much of the force applied by the rotatable actuator is absorbed due to the friction, causing a loss in braking efficiency.

In view of these problems, it is evident that the need exists for a ball ramp brake which provides a return mechanism with a reduced number of axially aligned springs and which eliminates the brake torque directional bias.

DISCLOSURE OF THE INVENTION

It is thus an object of the present invention to provide a ball ramp brake which incorporates a central spring.

It is a further object of the present invention to provide a brake, as above, which applies an axially aligned return force.

It is an additional object of the present invention to provide a brake, as above, which is efficient.

It is another object of the present invention to provide a brake, as above, which eliminates brake torque directional bias.

These and other objects of the present invention, as well as the advantages thereof over existing prior art forms, which will become apparent from the description to follow, are accomplished by the improvements hereinafter described and claimed.

In general, a brake in accordance with the present invention is adapted to be rotationally coupled with an output shaft. The brake includes a housing having a first surface. The first surface includes a plurality of depressions which are circumferentially spaced about an axis. A rotatable actuator includes a second surface which has a plurality of depressions which are circumferentially spaced about the axis. The first and second surface depressions are adjacent to and face each other, and are adapted to carry one of a plurality of balls therebetween. At least one biasing means is centered about the axis and adapted to bias the rotatable actuator toward the housing. When the rotatable actuator is caused to rotate, it correspondingly moves axially away from the housing, causing a braking force to be applied to the output shaft.

In accordance with another aspect of the present invention, a brake which is adapted to be rotationally coupled with an output shaft includes a housing which defines a chamber. The housing includes a boss which projects into the chamber and is centered on an axis. A rotatable actuator is received in the chamber and is rotatable about the axis. The rotatable actuator includes a body portion and a central circumferential flange which extends radially inward relative to the body portion. The central circumferential flange defines a central aperture. A spring is included. A means is positioned proximate to the axial end of the boss to retain the spring against the circumferential flange. The boss is received through the aperture and a spring is carried by the boss and axially confined between the circumferential flange and the retaining means. When the rotatable actuator is rotated, a braking force is applied to the output shaft.

In accordance with yet another aspect of the present invention, a brake for applying a braking force to an external shaft includes a housing which defines a chamber. The housing includes a plurality of depressions which are circumferentially spaced around an axis. A rotatable actuator is received in the chamber and includes a plurality of depressions circumferentially spaced around the axis. The housing depressions face the rotatable actuator depressions and each matching pair of depressions receive a ball therebetween. A spring under compression is positioned centrally about the axis. When the rotatable actuator is rotated, the balls roll along the depressions which moves the rotatable actuator axially away from the housing to apply a braking force to the shaft. The spring compressively opposes the axial movement of the rotatable actuator away from the housing.

In accordance with still another aspect of the present invention, a brake for applying a braking force to a shaft includes a housing having a plurality of depressions which are circumferentially spaced around an axis. A rotatable actuator is positioned proximate to the housing and includes a plurality of depressions circumferentially spaced around the axis. The housing depressions face the rotatable actuator depressions. A ball is received between each matching pair of depressions. A disc assembly includes a plurality of stationary discs operatively coupled to the housing and a plurality of rotatable discs carried by the shaft. The rotatable discs are positioned to be engaged by the stationary discs, and an annular roller bearing is positioned between the disc assembly and the rotatable actuator. When the rotatable actuator is rotated, the balls roll along the depressions to gradually shallower portions thereof to move the rotatable actuator axially away from the housing.

In accordance with still another aspect of the present invention, a brake for applying a braking force to a shaft including a housing having a plurality of depressions which are circumferentially spaced around an axis. A rotatable actuator is positioned proximate to the housing, and includes a plurality of depressions circumferentially spaced around the axis. The housing depressions face the rotatable actuator depressions. A ball is received between each matching pair of depressions. A disc assembly includes a plurality of stationary discs operatively coupled to the housing and a plurality of rotatable discs carried by the shaft. The rotatable discs are positioned to be engaged by the stationary discs. A bearing positioned between the disc assembly and the rotatable actuator, and a spring under compression is positioned centrally about the axis. When the rotatable actuator is rotated, the balls roll along the depressions to move the rotatable actuator axially away from the housing, thereby applying a braking force to the shaft. The spring opposes the axial movement of the rotatable actuator away from the housing.

A preferred exemplary ball ramp brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
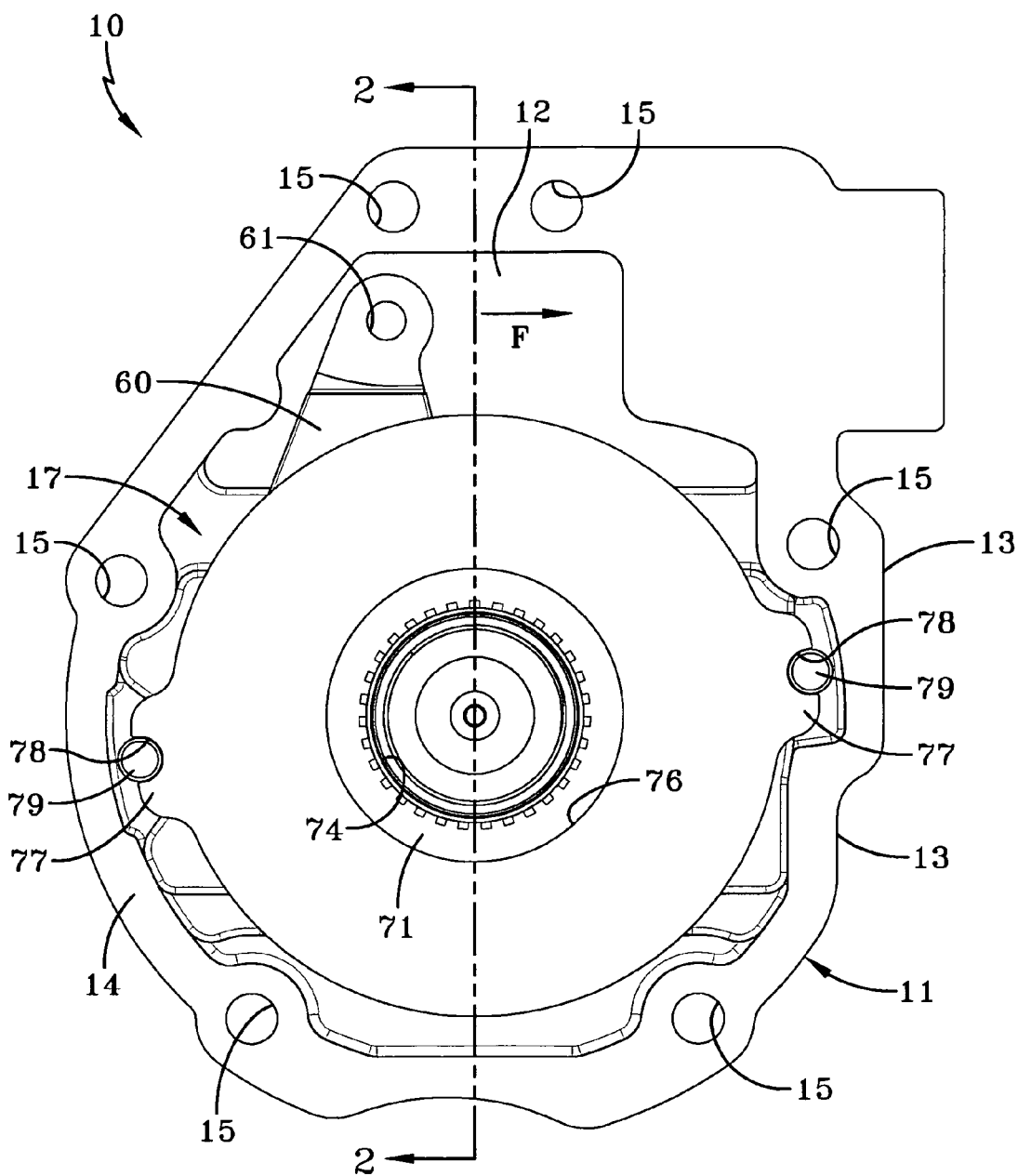
FIG. 1 is a elevational view showing a brake assembly made in accordance with the present invention.

A brake made in accordance with the present invention is indicated generally by the numeral 10 and includes a housing 11 which contains and protects the working brake components in addition to providing means to mount brake 10 to a piece of equipment or vehicle. Housing 11 is generally cup-shaped in section having a back wall 12 which generally defines the base of housing 11, and a side wall 13 extending from the outer periphery of back wall 12. Side wall 13 terminates at a mounting surface 14 which may be generally planar to facilitate mounting flush to a vehicle or device frame (not shown). Further to that end, a plurality of bores 15 may be provided which extend through both back wall 12 and sidewall 13. Bores 15 may receive securing means therethrough which are captured by the vehicle body to secure brake 10 thereto. For example, a plurality of bolts (not shown) may be provided which are received through bores 15 and secured to a vehicle or machine frame. A cover plate 16 is secured to back wall 12 by a plurality of bolts 32. Cover plate 16 may be removed to provide access to brake components, such as cables, during installation or servicing.

Figure 2:
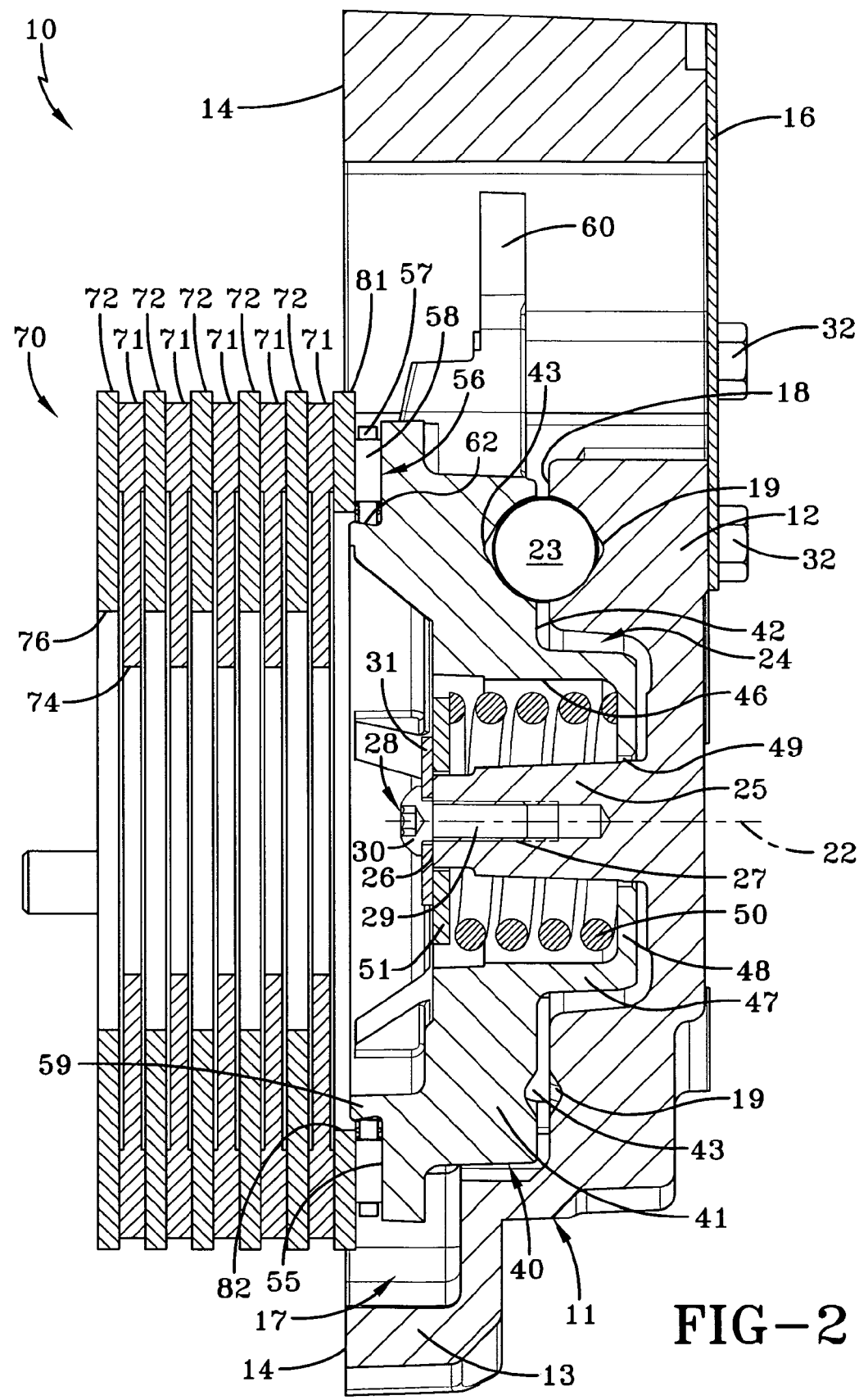
FIG. 2 is a sectional view taken substantially along line 2-2 of FIG. 1.
Figure 3:
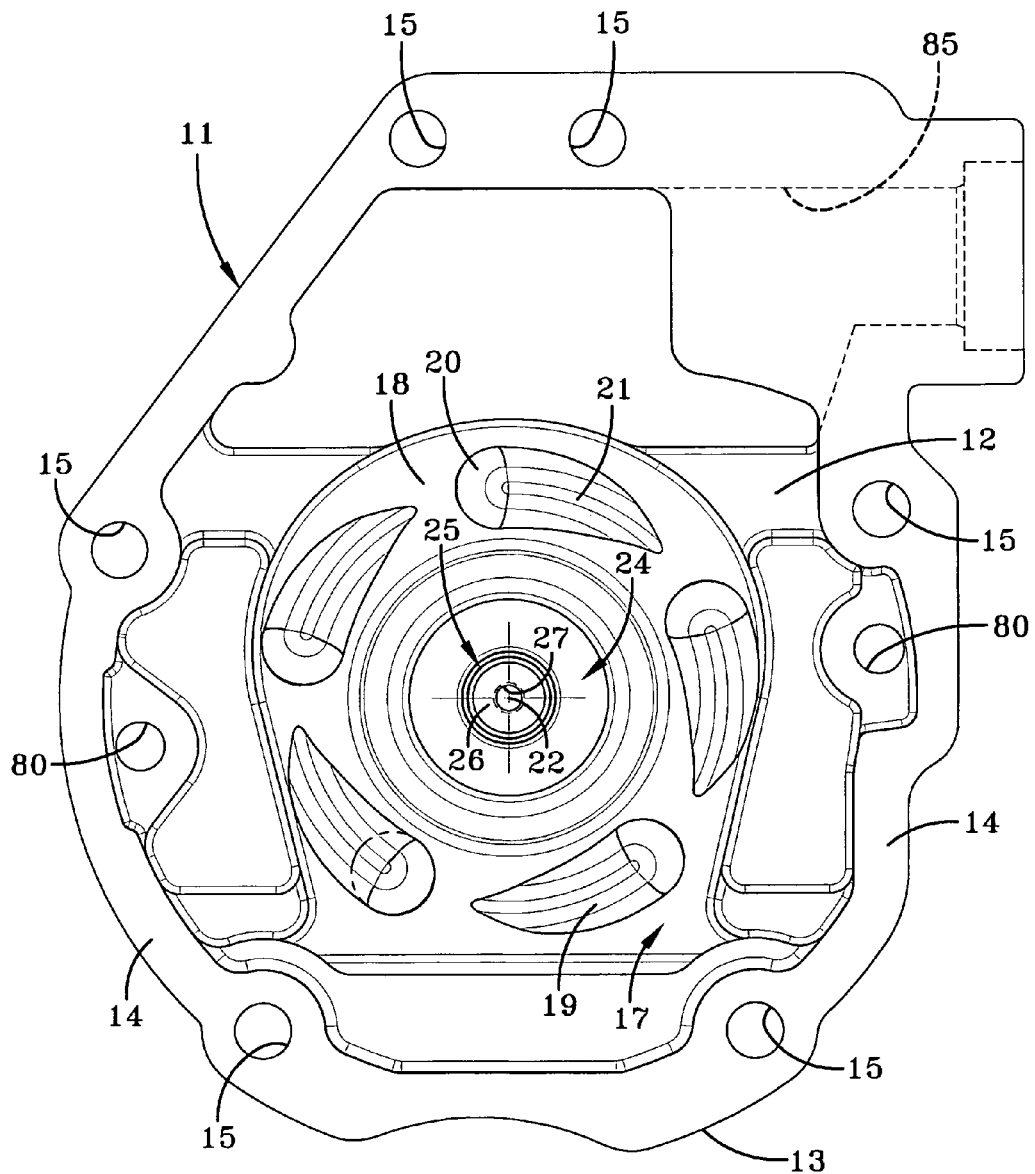
FIG. 3 is an elevational view of the inside of a housing of the brake of FIG. 1.

As is evident from FIGS. 2 and 3, back wall 12 and side wall 13 define a chamber 17, in which some of the working brake components reside. Chamber 17 is provided with a stationary actuator surface 18 (hereinafter stationary surface 18) which extends axially outwardly from back wall 12 into chamber 17. As is evident from FIG. 3, stationary surface 18 is provided with a plurality of depressions 19. In the present embodiment, five depressions 19 are shown and are disposed in a spaced circumferential pattern about an axis 22. Each depression 19 includes a head portion 20 and a tapered tail portion 21 projecting circumferentially therefrom. Depressions 19 are deepest at the head portion 20 and become relatively more shallow along tail portion 21. Though five depressions are shown in FIG. 3, it should be appreciated that more or less may be employed. Each depression 19 is adapted to receive a ball 23 therein. It is preferred that depressions 19 provide a gradual reduction in depth from head portion 20 to tail portion 21. This reduction in depth also corresponds to the direction of travel of ball 23, as will be hereinafter described.

As is evident from FIG. 2, housing 11 provides a cavity 24 which is formed radially interior of stationary surface 18. Cavity 24 projects into end wall 12 and may be generally cylindrical, centered about axis 22. A boss 25 is disposed at least partially within cavity 24 and projects axially from end wall 12. Boss 25 is centered on axis 22 and may be tapered. As is evident from FIG. 2, boss 25 terminates at a top surface 26 which is relatively further from end wall 12 than stationary surface 18. Boss 25 is provided with a threaded hole 27 which is aligned with axis 22 and extends from top surface 26 axially into boss 25. Threaded hole 27 is adapted to receive a screw 28 which includes a threaded portion 29 and a head 30. A boss washer 31 is secured between the head 30 and top surface 26 when the screw 28 is received in threaded hole 27.

Figure 4:
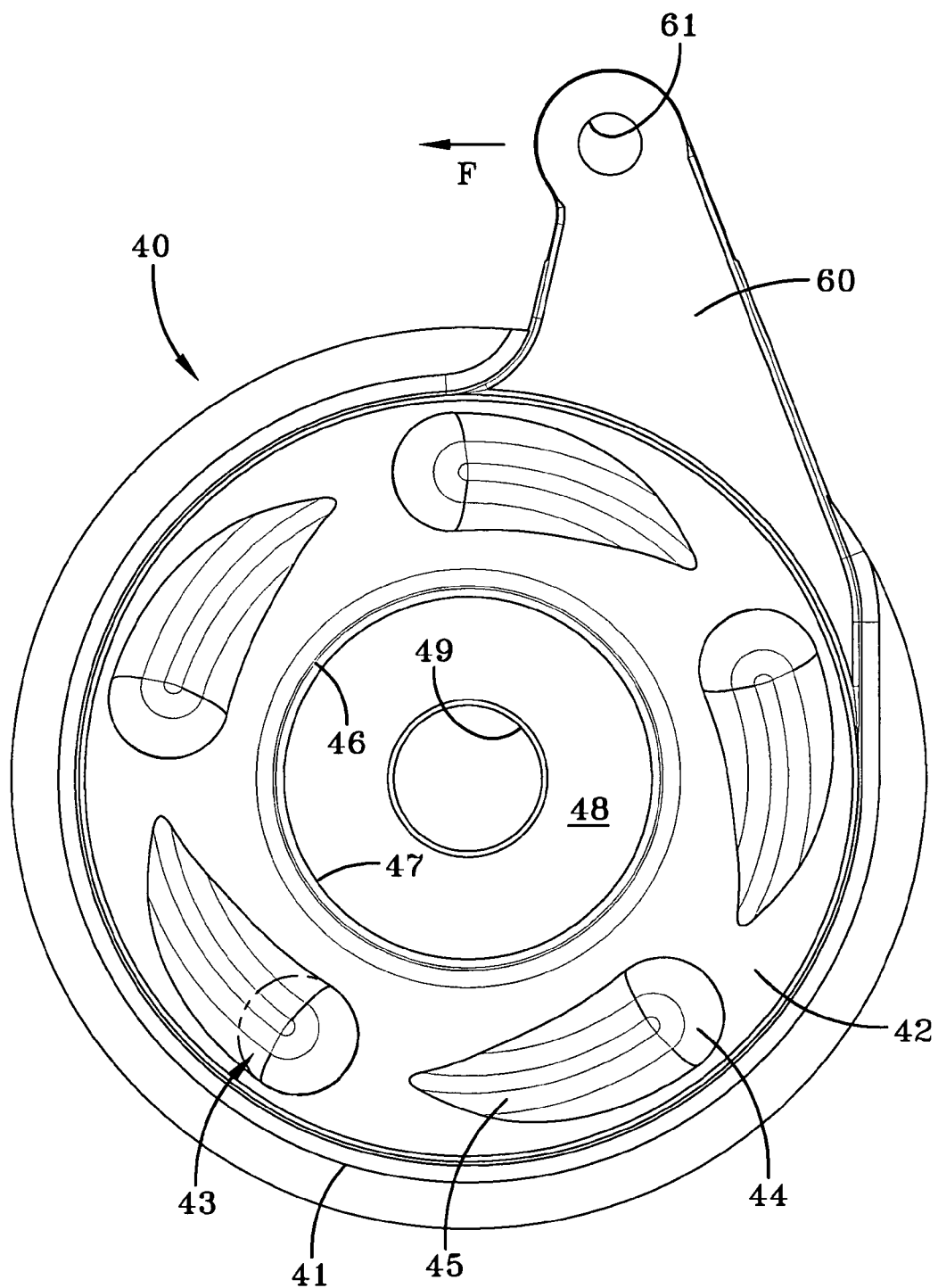
FIG. 4 is an elevational view of the rotatable actuator of the brake of FIG. 1.

Chamber 17 receives a rotatable actuator 40 therein. As will become evident, actuator 40 is rotatable about axis 22 and, upon such rotation, engages brake 10. Rotatable actuator 40 includes a generally annular body portion 41 centered around axis 22. Body portion 41 provides a rotatable actuator surface 42 (hereinafter rotatable surface 42) which is adjacent to and faces stationary surface 18. Rotatable surface 42 is generally disc-shaped and is provided with a plurality of depressions 43. As is best shown in FIG. 4, depressions 43 of rotatable actuator 40 are oriented to align with depressions 19 on housing 11. Thus, in the present embodiment, five depressions 43 are included, each having a head portion 44 and a tapered tail portion 45 projecting circumferentially therefrom. The depressions 43 are deepest at the head portion and become relatively more shallow along tail portion 44. Further, depressions 43 are spaced circumferentially the same distance from axis 22 as depressions 19. As shown in FIG. 2, each depression 43 is adapted to receive a ball 23 therein. In such a manner, each ball 23 is secured between adjacent or facing depressions 19 and 43. Further, when assembled, tail portion 21 of depression 19 faces in the opposed circumferential direction from tail portion 45 of depressions 43. Thus, as will become apparent, when rotatable actuator 40 is rotated about axis 22, balls 23 roll along the depressions 19 and 43 from head portions 20 and 44 towards tail portions 21 and 45, thereby moving to an area of gradually decreasing depth and consequently forcing rotatable actuator 40 axially away from end wall 12.

Rotatable actuator 40 is provided with a central bore 46 which is defined by body portion 41 and an axially extending lip 47 which projects axially toward end wall 12 into cavity 24. Lip 47 terminates at a circumferential flange 48 which projects radially inward and defines an aperture 49. Aperture 49 is sized to allow boss 25 to extend therethrough. Positioned between flange 48 and boss washer 31 is a spring 50. While a single spring 50 is shown, it should be appreciated that a plurality of springs may be employed. For example, a pair of springs may be provided with one having a diameter greater than the other. The springs could then be concentrically positioned between flange 48 and boss washer 31.

A retaining washer 51 is positioned between springs 50 and boss washer 31. The inner diameter of retaining washer 51 is sized to allow the boss 25 to fit therein. The outer diameter of retaining washer 51 is sized to allow sufficient surface area for spring 50 to contact. Thus, spring 50 is positioned around boss 25 and axially confined between flange 48 and retaining washer 51. As shown in FIG. 2, spring 50 is under compression when assembled and thus biases rotatable actuator 40 towards end plate 12. This occurs because spring 50 presses against both retaining washer 51 and flange 48. Because retaining washer 51 is prevented from axial movement away from end wall 12 by boss washer 31, a compressive force presses against flange 48 of rotatable actuator 40 and urges rotatable actuator 40 towards end wall 12.

It should be appreciated that the assembly and compression of springs 50 is achieved through a simplified method. Rotatable actuator 40 and balls 23 are placed within chamber 17 in the previously described orientation. Spring 50 is then positioned within bore 46. Retaining washer 51 and boss washer 31 are positioned on the end of spring 50 opposed to flange 48. Screw 28 is then inserted into threaded hole 27. Prior to rotation of screw 28, no tension is realized on spring 50. As screw 28 is tightened, thus moving boss washer 31 and retaining washer 51 axially toward end wall 12, spring 50 is compressed. Spring 50 may be sized such that once screw 28 is fully tightened, thereby securing boss washer 31 between head 30 and top surface 26, the optimal compression is achieved.

Rotatable actuator 40 further includes a bearing surface 55 which faces away from end wall 12. Bearing surface 55 is adapted to contact a roller bearing assembly 56. Roller bearing assembly 56 is annular and includes a frame 57 which carries a plurality of radially oriented cylindrical bearings 58. A lip 59 is provided on the inner radial edge of bearing surface 55 which radially locates roller bearing assembly 56 on rotatable actuator 40. Lip 59 includes an inverted tapered surface 62 on the outer radial side thereof. Rotatable actuator 40 is further provided with an actuator arm 60 which projects radially from body 41. Actuator arm 60 is provided with an eyelet 61 which is adapted to facilitate connection to an actuator cable (not shown).

Brake 10 includes a disc assembly generally indicated by the numeral 70, which includes a plurality of rotatable discs 71 and a plurality of stationary discs 72. Rotatable discs 71 and stationary discs 72 are stacked in an alternating manner as seen in FIG. 2. In the present embodiment five rotatable and five stationary discs are shown, but it should be appreciated that any number may be used. Rotatable discs 71 are provided with a radially inner surface 74 which is splined to engage the matching splines of a drive shaft (not shown). In this manner, as the drive shaft rotates, rotatable discs 71 rotate therewith. Rotatable discs 71 are rotationally coupled to the shaft but are free to slide axially thereon. The drive shaft may be operatively coupled to any working mechanism. For example, the drive shaft may be operatively coupled to the axle of a vehicle. Thus, when a braking torque is applied to the drive shaft, it is consequently applied to the axle, thus slowing the vehicle or other device.

Stationary discs 72 have a radially inner surface 76 which fits over, but is not engage by, the splined drive shaft. As best shown in FIG. 1, stationary discs 72 are provided with diametrically opposed ears 77 which extend radially outwardly therefrom. In the embodiment disclosed, one pair of ears is provided, but it should be appreciated that any number of pairs may be employed. Each ear 77 is provided with a groove 78 which is adapted to slidingly receive a pin 79 therein. Pins 79 are each securely received in one of a plurality of holes 80 located in side wall 13 of housing 11. The opposed end of each pin 79 is received in a corresponding hole (not shown) in a vehicle or machine frame. In this manner, the pins are secured between the frame and housing 11. Likewise, stationary discs 72 are coupled to the housing via pins 79, and thus prevented from rotating. Stationary discs 72 are, however, free to slide axially along pins 79. When mounted to a vehicle or device, a surface (not shown) is provided which is proximate to the outermost stationary disc which prevents outward axial movement of the disc assembly. Therefore, when an axial force is applied to one end of disc assembly 70, the discs are caused to slide axially and in turn the discs are caused to engage each other. When the discs engage each other a braking torque is applied to the drive shaft due to the friction created between rotatable discs 71 and stationary discs 72 which are prevented from rotating by pins 79.

Figure 5:
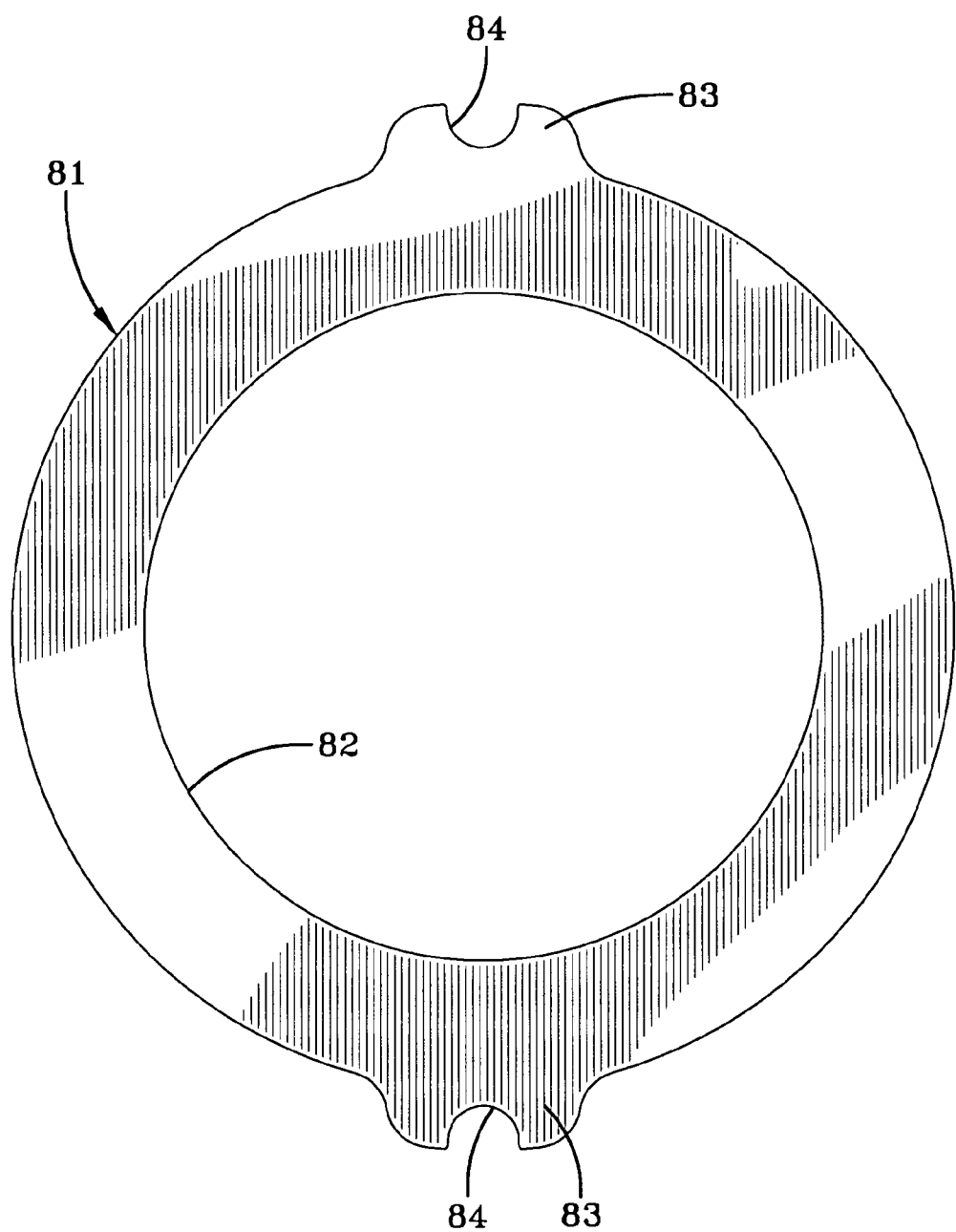
FIG. 5 is an elevational view of the primary disc of the brake of FIG. 1.

Disc assembly 70 further includes a primary disc 81 positioned on the end of disc assembly 70 proximate to the rotatable actuator 40. Primary disc 81 is annular, with an inner surface 82 which may fit over but does not engage the drive shaft. As is evident from FIG. 2, the inside diameter of primary disc 81 is relatively larger than that of stationary discs 72. This orientation allows clearance for lip 59 so that no frictional contact occurs between rotatable actuator 40 and primary disc 81. As seen in FIG. 5, primary disc 81 is provided with a pair of diametrically opposed ears 83 which extend radially outward therefrom. In present embodiment, one pair of ears is provided, but it should be appreciated that any number of pairs may be provided. Ears 83 are adapted to slidingly engage pins 79. To that end, each ear is provided with a groove 84, each of which slidingly receives a pin 79 therein. In this manner, primary disc 81 is coupled to the housing, and thus prevented from rotating. The primary disc 81 is, however, free to slide axially along pins 79. As is evident from FIG. 2, bearing 56 is interposed between primary disc 81 and rotatable actuator 40. Thus, the bearing 56 transfers axial forces between rotatable actuator 40 and primary disc 81 yet, because rollers 58 roll along bearing surface 55 and along the surface of primary disc 81, no rotational torque is transferred between disc assembly 70 and rotatable actuator 40.

An unactuated state is achieved when no external forces are applied to brake 10. In such a case, spring 50 biases rotatable actuator 40 axially toward end wall 12. Because no other forces are present, rotatable actuator 40 will orient itself such that balls 23 reside in head portions 20 and 44 of the respective depressions 19 and 43. Thus, in the unactuated state, balls 23 reside in the deepest portions of the depressions and therefore rotatable actuator 40 is positioned at the shortest relative distance from end wall 12 so that rotatable discs 71 can rotate freely between stationary discs 72.

Brake 10 may be selectively actuated, thereby applying a braking force to the shaft. Actuation is accomplished by applying a generally tangential force F on actuator arm 60, which may be provided by an actuator cable (not shown) which extends through a bore 85 (FIG. 3) in the housing 11. By pulling on actuator arm 60 the rotatable actuator 40 is caused to rotate around axis 22 which in turn causes depressions 43 of rotatable actuator 40 to move relative to depressions 19 of housing 11. As such, each ball 23 rolls along tail portions 22 and 45 to progressively shallower portions of the respective depressions. Such movement gradually forces rotatable actuator 40 axially away from end wall 12 of housing 11. This axial force is then transferred to the disc assembly 70 via the roller bearing 56. Because rollers 58 are free to rotate, only axial, and no rotational force is transmitted. Thus, almost no rotational frictional forces are transferred to the primary disc 81. The axial force is thus applied to primary disc 81 and consequently the entire disc assembly 70 slides axially. Because disc assembly 70 is prevented from outward axial movement by a surface on the vehicle, the discs are caused to engage each other. When the discs engage each other, a braking torque is applied to the drive shaft due to the friction created between rotatable discs 71 and stationary discs 72 which are prevented from rotating by pins 79.

When the force F is released, spring 50, by pressing against flange 48, forces rotatable actuator 40 axially toward end wall 12. In doing so, rotatable actuator 40 will rotate and return to it's unactuated state. The unactuated state is achieved when balls 23 again rest in the deepest portions of depressions 19 and 43.

The presence of roller bearing 56, provides further advantages to brake 10. Specifically, because the bearing 56 is interposed between the rotatable actuator 40 and the primary disc 81, no feedback rotation is transferred to the rotatable actuator 40. In other words, as the disc assembly 70 compresses, the feedback rotation from primary disc 81 causes bearing 56 to rotate, and because bearing 56 rolls across bearing surface 55, the torque is not transferred to the rotatable actuator 40. Thus, no directional bias is realized and consequently the same braking force is applied regardless of the direction of rotation of the shaft.

It should also be appreciated that boss washer 31 and retaining washer 51 act as a bearing surface. Specifically, as rotatable actuator 40 rotates, spring 50 and retaining washer 51 rotate with it. Boss washer 31 is rotationally fixed by screw 28. This orientation generates relatively low frictional forces and thus does not hamper efficiency of the brake.

Thus the above described brake 10 represents an improvement over prior art brakes. Specifically, by positioning spring 50 centered on axis 22, very high actuator return forces can be realized. Indeed, central spring 50 provides the forces needed not only to return the rotatable actuator 40 to the unactuated position, but to return a brake actuation cable as well. Further, compression of spring 50 is simplified. Specifically, tension is applied by simply running down screw 28 into hole 27. This alleviates the need to pre-tension springs using complicated assembly procedures. Still further, by providing the spring 50 centered on axis 22, a centered and axially balanced return force is applied to rotatable actuator 40, thereby eliminating imbalances which could lead to shortened brake life. Further, because the bearing 56 is interposed between the rotatable actuator 40 and the primary disc 81, no rotational torque is transferred therebetween and thus no directional bias is realized. Therefore, the same braking force is applied regardless of the direction of rotation of the shaft.

In view of the foregoing, it should thus be evident that a brake as described herein accomplishes the objects of the present invention and otherwise substantially improves the art.

What is claimed is:

1. A brake adapted to be rotationally coupled with an output shaft, the brake comprising a housing including a first surface having a plurality of depressions circumferentially spaced about an axis, a rotatable actuator having a second surface, said second surface having a plurality of depressions circumferentially spaced about said axis, said first surface depression and said second surface depression being adjacent to and facing each other, and a ball positioned between each said first depression and each said second depression, a disc assembly including a plurality of stationary discs and a plurality of rotatable discs positioned between said stationary discs and carried by the output shaft, a bearing interposed between and in contact with said rotatable actuator and one of said stationary discs of said disc assembly, stationary discs of said disc assembly, a lip extending from said rotatable actuator, said lip including a tapered surface, said bearing is an annular roller bearing positioned between and in contact with said rotatable actuator and one of said stationary discs, said lip radially locating said annular roller bearing on said rotatable actuator, and biasing means centered about and biasing means centered about said axis and adapted to bias said rotatable actuator toward said housing, such that when said rotatable actuator rotates, said rotatable actuator moves axially away from said housing, causing a braking force to be applied to the output shaft.

2. A brake according to claim 1 wherein said biasing means includes a spring.

3. A brake according to claim 1 wherein said housing includes a boss which is centered on said axis, said boss receiving said bias means thereon.

4. A brake according to claim 3 wherein said rotatable actuator includes an annular body and a central cavity, said central cavity includes a bottom surface defined by a circumferential flange, said circumferential flange projecting radially inward and defining an aperture.

5. A brake according to claim 4 wherein said boss has an axial end and said brake includes a retaining washer positioned proximate to the axial end of said boss, said boss projecting through said aperture, said biasing means being axially confined by said retaining washer and said flange.

6. A brake according to claim 5, wherein said boss includes a threaded hole centered on said axis and positioned on the axial end of said boss, and further comprising a screw received in said hole, and a boss washer captured by said screw and having a diameter greater than said boss.

7. A brake according to claim 6, wherein said retaining washer is slidably received on said boss and prevented from axial movement beyond the axial end of said boss by said boss washer.

8. A brake according to claim 1 wherein when said rotatable actuator includes a radially extending arm, said rotatable actuator being caused to rotate when a substantially tangential force is applied to said arm.

9. A brake for applying a braking force to a shaft comprising a housing including a plurality of depressions which are circumferentially spaced around an axis, a rotatable actuator positioned proximate to said housing, said rotatable actuator including a plurality of depressions circumferentially spaced around said axis, said housing depressions facing said rotatable actuator depressions, a ball received between each matching pair of depressions, a disc assembly including a plurality of stationary discs operatively coupled to said housing and a plurality of rotatable discs carried by the shaft, said rotatable discs being positioned to be engaged by said stationary discs, a lip extending from said rotatable actuator, said lip including a tapered surface, and an annular roller bearing positioned between and in contact with said rotatable actuator and one of said stationary discs, said lip radially locating said annular roller bearing on said rotatable actuator, wherein when said rotatable actuator is rotated, said balls roll along said depressions to move said rotatable actuator axially away from said housing.

10. A brake according to claim 9 further comprising a spring under compression positioned centrally about said axis and adapted to oppose the axial movement of said rotatable actuator away from said housing.

11. A brake according to claim 10 wherein said housing includes a boss which is centered on said axis, said boss receiving said spring thereon.

12. A brake according to claim 11 wherein said rotatable actuator includes an annular body and a central cavity, said central cavity includes a bottom surface defined by a circumferential flange, said circumferential flange projecting radially inward and defining an aperture.

13. A brake according to claim 12 wherein said boss has an axial end and said brake includes a retaining washer positioned proximate to the axial end of said boss, said boss projecting through said aperture, said spring being axially confined by said retaining washer and said flange.

* * * * *